Nov. 5, 1929.   H. SCHULER ET AL   1,734,051
GUARD FOR TOOTHED SECTOR GEARS
Filed Nov. 28, 1928
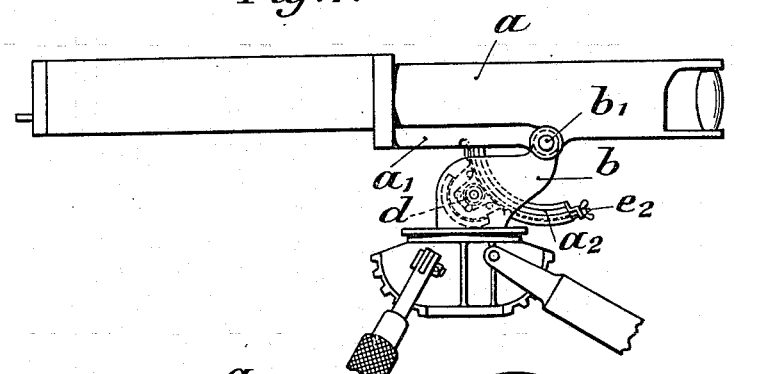
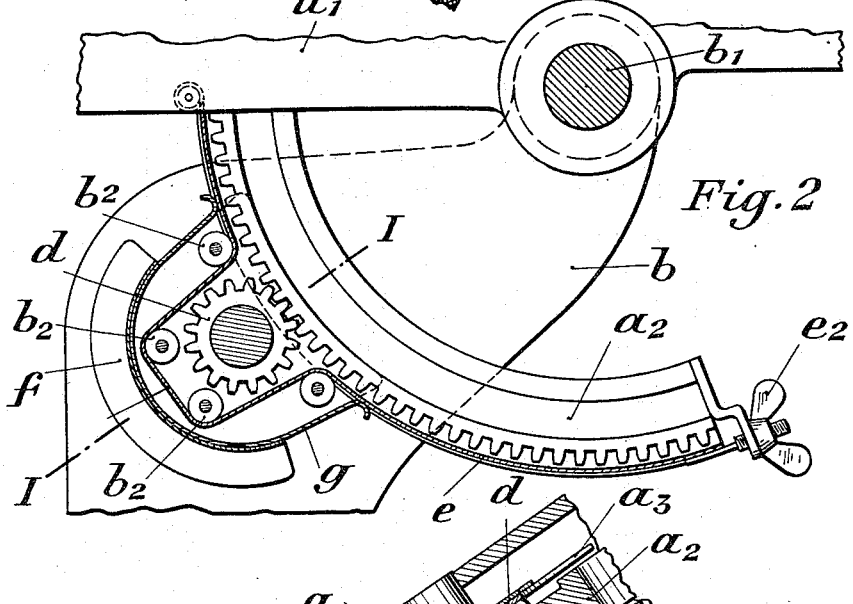
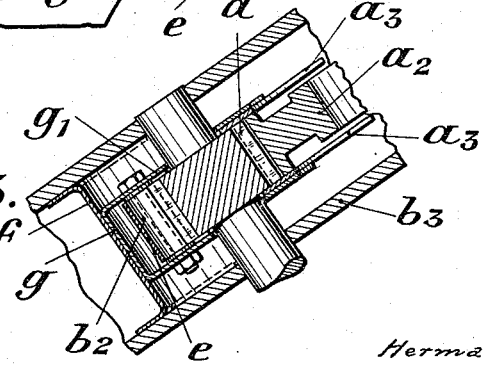
INVENTORS:
Hermann Schuler
and Alfred Krum
ATTORNEY.

Patented Nov. 5, 1929

1,734,051

UNITED STATES PATENT OFFICE

HERMANN SCHULER, OF DUSSELDORF, AND ALFRED KRUM, OF DUSSELDORF-ELLER, GERMANY, ASSIGNORS TO RHEINISCHE METALLWAAREN- UND MASCHINENFABRIK, OF DUSSELDORF-DERENDORF, GERMANY

GUARD FOR TOOTHED-SECTOR GEARS

Application filed November 28, 1928, Serial No. 322,513, and in Germany April 20, 1928.

To protect toothed sector gears or rack and pinion gears against soiling from the outside and to prevent accidents it has already been proposed to perfectly cover such gears by guards. The rigid guard has been extended over the toothed sector and the gear cooperating therewith and connected to one of the two gear parts. Guards of this construction were of great dimensions forming considerable obstructions or obstacles and did not offer the necessary rigidity. For machines of compact construction, for instance, pointing machines for guns and the like, these guards were not suitable if not useless.

The object of the present invention is to provide a guard which perfectly encloses toothed sector gears of all dimensions without causing trouble by space requirements and without enlarging the dimensions of the gear. The toothing of the sector is, according to the invention, covered by a flexble band or strip which is fixed at both ends of the sector. To assure an unobstructed engagement of the gear cooperating with the toothed sector suitable means are used to lift the band or strip from the toothed sector and guide it over the pinion at the points of engagement of both gears. For this purpose a guide roller system connected to the bearing of the pinion is provided which, by a suitable arrangement of the rollers and proper selection of the diameter of the rollers, assures good accommodation of the band or strip to the outer form of the pinion.

Preferably the band or strip is adjustably connected to the gear, so that, by tightening of the band or strip, the movability of the gear may be locked altogether. This is of particular importance for gears of pointing sectors of arms, for instance automatic fire arms which sometimes, after cutting out the drive provided with a self checking device, must be pointed by direct movement by hand and yet be capable of being fixed in each position.

In the accompanying drawing one mode of carrying out the invention is shown by way of example in connection with the vertical pointing machine of an automatic fire arm.

Fig. 1 shows a side elevation; Fig. 2 is a vertical section through the toothed sector gear on a larger scale and Fig. 3 is a cross-section on line I—I of Fig. 2.

The support $a_1$ carrying the automatic fire arm $a$ is swingably mounted about the horizontal trunnion axis $b_1$ in the upper carriage $b$. A hand drive, not shown in the drawing, is connected to the pinion $d$ rotatably mounted in the upper carriage $b$. The pinion $d$ engages the toothed sector $a_2$ fixed to the support $a_1$ of the automatic fire arm. According to the present invention a flexible strip or band $e$ of steel is arranged above the teeth of the sector $a_2$ and the pinion $d$ both ends of which band are fixed to the ends of the toothed sector. The band or strip $e$ is adjustable. By means of the wing nut $e_2$ the movability of the toothed sector and thereby the run of the vertical pointing machine of the automatic fire arm may be altered and, if desired, the gear may, by the tightened band, be perfectly locked against movement. The flexible band or strip $e$ is lifted from the periphery of the toothed sector $a_2$ and guided around the pinion $d$ and back to the toothed sector $a_2$ by means of rollers $b_2$ the axes of which are arranged parallel to the axis of the pinion $d$ and locally fixed relatively to the side walls $b_3$ of the upper carriage $b$ which walls form the bearing for the pinion $d$. As in the construction shown the distance of the side walls $b_3$ of the upper carriage from each other is greater than the width of the toothed sector gear, a plate $f$ is fixed betwen the side walls $b_3$ and this plate carries a guard cap $g$ enclosing the pinion $d$ and the band or strip $e$. Between the side walls $g_1$ of the cap $g$ which simultaneously serve as bearing for the roller axes, sheet metal plates $a_3$ are slideably arranged which are fixed to the lateral faces of the toothed sector and protect the gaps between the teeth against soiling. The toothed sector gear is therefore completely enclosed and protected by this enclosure against the entrance of dirt from any side in any elevated position of the automatic fire arm, that is to say in any position of the toothed sector $a_2$ relatively to the pinion $d$ journalled in fixed bearings.

What we claim is:

1. In a guard for toothed sector gears, particularly for a toothed sector gear of a printing machine of an automatic fire arm, a toothed sector, a pinion cooperating with said sector, a flexible band covering the toothing of said sector and fixed at both ends of same and means for lifting said band off the toothing of said sector and guiding it over said pinion, so that said pinion may freely engage and rotate in engagement with said toothed sector.

2. In a guard for toothed sector gears, particularly for a toothed sector gear of a pointing machine of an automatic fire arm, a toothed sector, a pinion cooperating with said sector, a flexible band covering the toothing of said sector and fixed at both ends of same and a guide roller system fixedly arranged around said pinion, said roller system serving for lifting said band off the toothing of said sector and guiding it over said pinion, so that said pinion may freely engage and rotate in engagement with said toothed sector.

3. In a guard for toothed sector gears, particularly for, a toothed sector gear of a pointing machine of an automatic fire arm, a toothed sector, a pinion cooperating with said toothed sector, a flexble band coverng the toothing of said sector and fixed at both ends of same, means for adjusting said band and thereby eventually locking said gear and a guide roller system fixedly arranged around said pinion, said roller system serving for lifting said band off the toothing of said pinion, so that said pinion may freely engage and rotate in engagement with said toothed sector.

In testimony whereof we have affixed our signatures.

HERMANN SCHULER.
ALFRED KRUM.